United States Patent
Ferro et al.

(10) Patent No.: US 8,103,391 B2
(45) Date of Patent: Jan. 24, 2012

(54) SYSTEM FOR DETECTING INTERRUPT CONDITIONS DURING AN ELECTRIC VEHICLE CHARGING PROCESS

(75) Inventors: Erica Haefner Ferro, Boulder, CO (US); Mark William Trekell, Aurora, CO (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 12/194,325

(22) Filed: Aug. 19, 2008

(65) Prior Publication Data
US 2010/0049396 A1    Feb. 25, 2010

(51) Int. Cl.
G06F 7/00     (2006.01)
G06F 19/00    (2011.01)

(52) U.S. Cl. .............. 701/1; 701/33; 701/123
(58) Field of Classification Search .............. 701/1, 33, 701/123
See application file for complete search history.

(56) References Cited

U.S. PATENT DOCUMENTS

| | | | |
|---|---|---|---|
| 3,867,682 A * | 2/1975 | Yamauchi et al. | 320/139 |
| 4,389,608 A * | 6/1983 | Dahl et al. | 320/137 |
| 4,433,278 A | 2/1984 | Lowndes et al. | |
| 4,532,418 A | 7/1985 | Meese et al. | |
| 5,422,624 A | 6/1995 | Smith | |
| 5,563,491 A | 10/1996 | Tseng | |
| 5,736,833 A * | 4/1998 | Farris | 320/163 |
| 6,067,008 A | 5/2000 | Smith | |
| 6,081,205 A | 6/2000 | Williams | |
| 6,234,932 B1 | 5/2001 | Kuroda et al. | |
| 6,252,380 B1 | 6/2001 | Koenck | |
| 6,301,531 B1 | 10/2001 | Pierro et al. | |
| 6,307,349 B1 | 10/2001 | Koenck et al. | |
| 6,373,380 B1 | 4/2002 | Robertson et al. | |
| 6,456,041 B1 | 9/2002 | Terada et al. | |
| 6,727,809 B1 | 4/2004 | Smith | |
| 6,766,949 B2 | 7/2004 | Terranova et al. | |
| 6,789,733 B2 | 9/2004 | Terranova et al. | |

(Continued)

FOREIGN PATENT DOCUMENTS
JP    2001359203 A    12/2001

OTHER PUBLICATIONS

USPTO office action for U.S. Appl. No. 12/139,575 dated Oct. 8, 2010.

(Continued)

*Primary Examiner* — Sarah B McPartlin
(74) *Attorney, Agent, or Firm* — Yee & Associates, P.C.; David A. Mims, Jr.

(57) ABSTRACT

Illustrative embodiments disclose managing a charging process of an electric vehicle. Begin by monitoring a set of operational parameters of the charging process during the flow of electricity for one or more interruptions in response to receiving, from an energy transaction execution engine, a request signaling the start of the charging process. The process then detects the one or more interruptions during the flow of electricity from the set of operational parameters, which conform to a set of predefined interrupt conditions. In one embodiment, the one or more interruptions include at least one of a device capability interruption, a preference interruption, and a data services interruption. The process sends a response to the energy transaction execution engine to terminate the charging transaction in response to detecting the one or more interruptions.

20 Claims, 6 Drawing Sheets

U.S. PATENT DOCUMENTS

| | | | |
|---|---|---|---|
| 6,850,898 | B1 | 2/2005 | Murakami et al. |
| 7,402,978 | B2 | 7/2008 | Pryor |
| 7,693,609 | B2 | 4/2010 | Kressner et al. |
| 2002/0064258 | A1 | 5/2002 | Schelberg, Jr. et al. |
| 2003/0153278 | A1 | 8/2003 | Johnson, Jr. |
| 2003/0205619 | A1 | 11/2003 | Terranova et al. |
| 2004/0265671 | A1 | 12/2004 | Chipchase et al. |
| 2005/0044245 | A1 | 2/2005 | Hoshina |
| 2006/0182241 | A1 | 8/2006 | Schelberg, Jr. et al. |
| 2006/0282381 | A1 | 12/2006 | Ritchie |
| 2006/0287783 | A1 | 12/2006 | Walker |
| 2007/0126395 | A1 | 6/2007 | Suchar |
| 2007/0282495 | A1 | 12/2007 | Kempton et al. |
| 2008/0039979 | A1 | 2/2008 | Bridges et al. |
| 2008/0039989 | A1 | 2/2008 | Pollack et al. |
| 2008/0040223 | A1 | 2/2008 | Bridges et al. |
| 2008/0040295 | A1 | 2/2008 | Kaplan et al. |
| 2008/0052145 | A1 | 2/2008 | Kaplan et al. |
| 2008/0086411 | A1 | 4/2008 | Olson et al. |
| 2008/0097904 | A1 | 4/2008 | Volchek et al. |
| 2008/0155008 | A1 | 6/2008 | Stiles et al. |
| 2008/0281663 | A1 | 11/2008 | Hakim et al. |
| 2009/0021213 | A1 | 1/2009 | Johnson |
| 2009/0030712 | A1 | 1/2009 | Bogolea et al. |
| 2009/0043519 | A1 | 2/2009 | Bridges et al. |
| 2009/0066287 | A1 | 3/2009 | Pollack et al. |
| 2009/0076913 | A1 | 3/2009 | Morgan |
| 2009/0082957 | A1 | 3/2009 | Agassi et al. |
| 2009/0092864 | A1 | 4/2009 | McLean et al. |
| 2009/0144001 | A1 | 6/2009 | Leonard et al. |
| 2009/0174365 | A1 | 7/2009 | Lowenthal et al. |
| 2009/0177580 | A1 | 7/2009 | Lowenthal et al. |
| 2009/0210357 | A1 | 8/2009 | Pudar et al. |
| 2009/0287578 | A1 | 11/2009 | Paluszek et al. |
| 2010/0017045 | A1 | 1/2010 | Nesler et al. |
| 2010/0169008 | A1 | 7/2010 | Niwa et al. |

OTHER PUBLICATIONS

USPTO office action for U.S. Appl. No. 12/194,210 dated Nov. 22, 2010.
U.S. Appl. No. 12/139,562, filed Jun. 16, 2008, Hafner et al.
U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/139,561, filed Jun. 16, 2008, Hafner et al.
U.S. Appl. No. 12/194,341, filed Aug. 19, 2008, Ambrosio et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,574, filed Jun. 16, 2008, Ambrosio et al.
U.S. Appl. No. 12/139,575, filed Jun. 16, 2008, Hafner et al.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO final office action for U.S. Appl. No. 12/194,210 dated Mar. 25, 2011.
USPTO notice of allowance for U.S. Appl. No. 12/139,575 dated Mar. 8, 2011.
USPTO office action for U.S. Appl. No. 12/139,569 dated Apr. 25, 2011.
USPTO office action for U.S. Appl. No. 12/139,571 dated Apr. 25, 2011.
USPTO office action for U.S. Appl. No. 12/139,565 dated Jun. 1, 2011.
USPTO office action for U.S. Appl. No. 12/194,290 dated Jun. 4, 2010.

* cited by examiner

SYSTEM FOR DETECTING INTERRUPT CONDITIONS DURING AN ELECTRIC VEHICLE CHARGING PROCESS

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for monitoring a charging process for interrupt conditions that terminate the charging process.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, biodiesel powered engines, solar powered generators, and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently, off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure, which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

Embodiments of the inventions disclose managing a charging process of an electric vehicle. The process begins by monitoring a set of operational parameters of the charging process during the flow of electricity for one or more interruptions in response to receiving, from an energy transaction execution engine, a request signaling the start of the charging process. The process then detects the one or more interruptions during the flow of electricity from the set of operational parameters, which conform to a set of predefined interrupt conditions. In one embodiment, the one or more interruptions include at least one of a device capability interruption, a preference interruption, and a data services interruption. The process sends a response to the energy transaction execution engine to terminate the charging transaction in response to detecting the one or more interruptions.

DETAILED DESCRIPTION OF THE INVENTION

Figure 1:
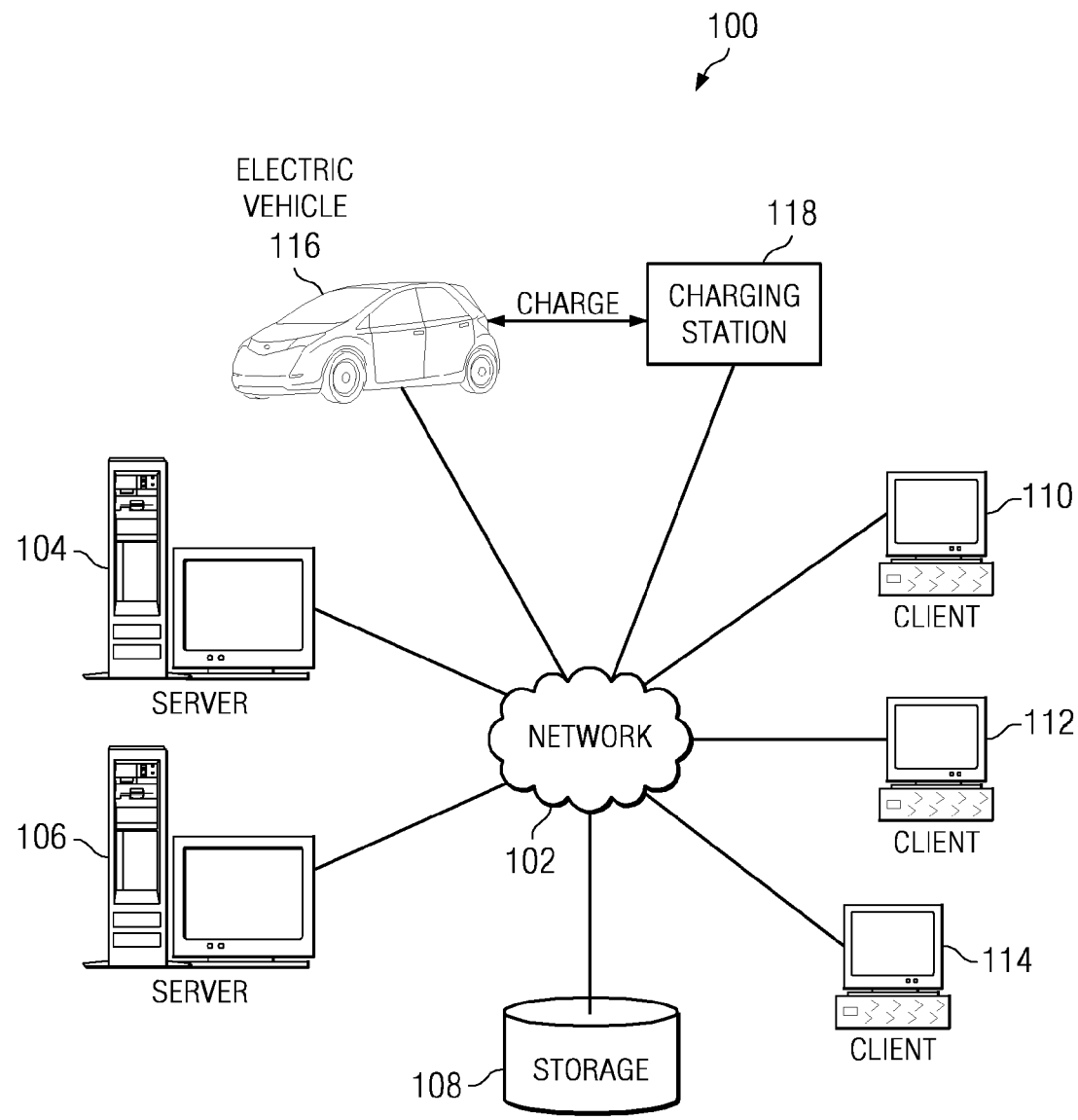
FIG. 1 is a pictorial representation of a network of data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
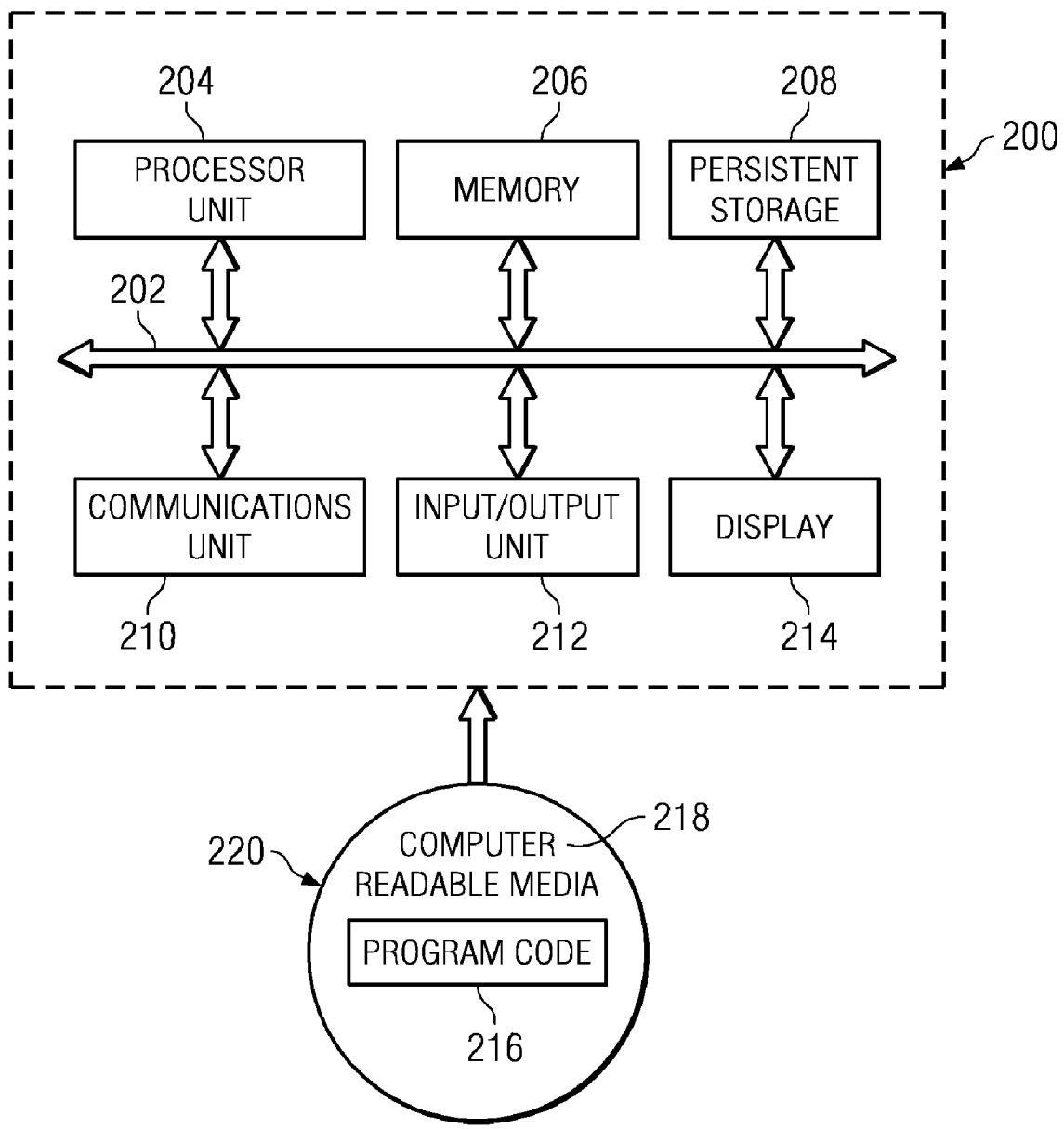
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole or in part to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism, such as, but without limitation, solar power electric generators, gasoline powered electric generators, biodiesel powered electric generator, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, all parties are presented with the conditions governing the charging transaction. Electricity flows to the electric vehicle and payment is made during the post-charge phase. Finally, during the post-charge phase of the transaction, an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
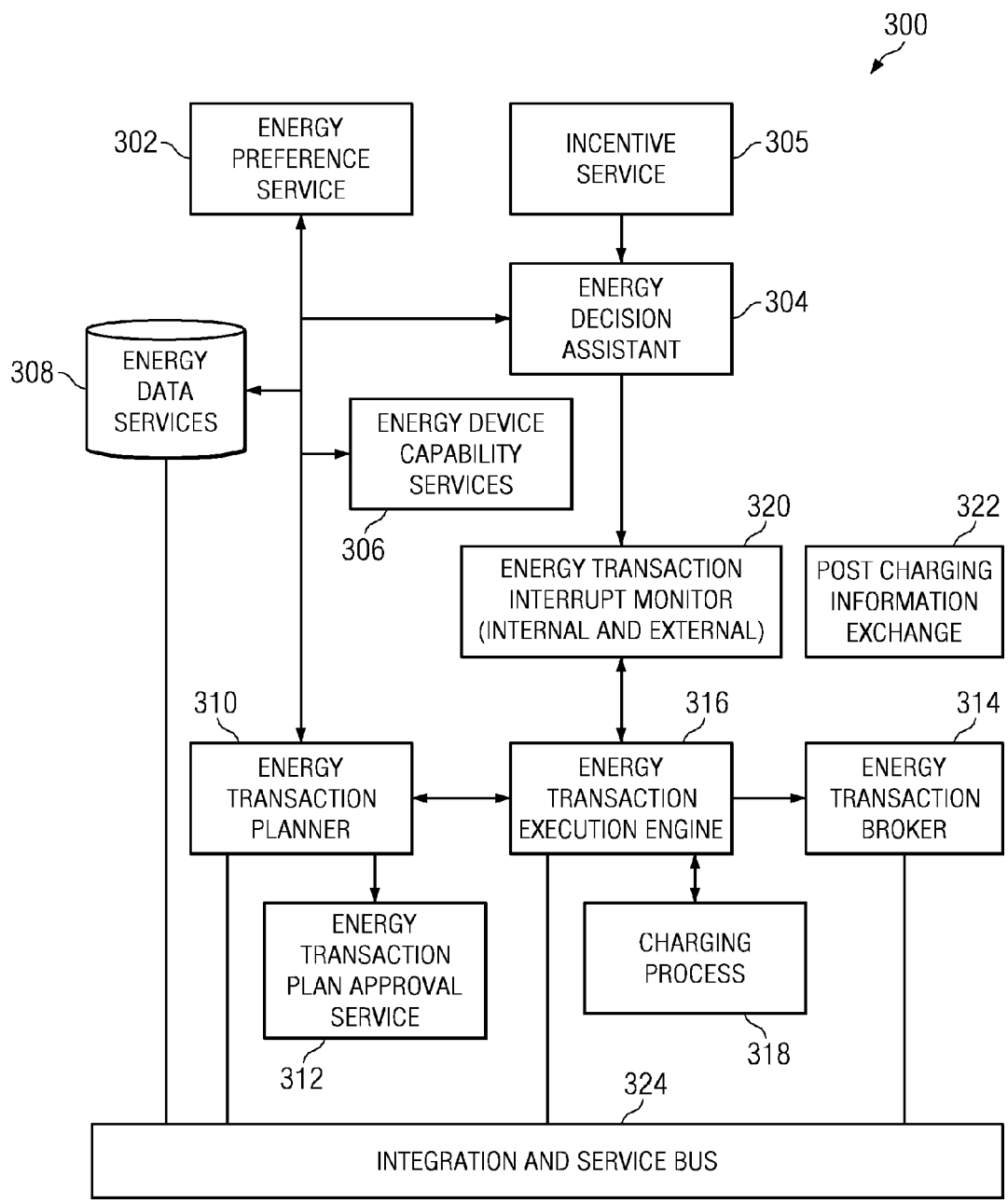
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. The components of electric vehicle energy transaction vehicle charging infrastructure 300 include components of a network data processing system, such as network data processing system 100 in FIG. 1. For example, preference services or data services of electric vehicle energy transaction vehicle charging infrastructure 300 may be implemented in server 104 in FIG. 1.

During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions, which are presented in standard formats which are universally understood and which can be readily communicated and agreed upon by all parties.

During the pre-charge phase, electric vehicle energy transaction infrastructure 300 utilizes energy preference service 302, energy decision assistant 304, energy device capability services 306, energy data services 308, energy transaction planner 310, and optionally, energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentive service 305 provides information describing current incentives to energy transaction planner 310. In one embodiment, incentive service 305 provides the information describing the incentives to energy decision assistant 304. Energy decision assistant 304 then provides the incentives information to energy transaction planner 310.

Energy device capability service 306 is a software component that identifies and validates device capabilities. For example, and without limitation, energy device capability service 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing the electric vehicle charging transaction based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction.

In this example, the charging phase begins when energy transaction execution engine 316 sends the transaction plan generated by energy transaction planner 310 for approval by energy transaction plan approval service 312. Thereafter, the energy transaction execution engine 316 initiates charging process 318 for charging the electric vehicle. Charging process 318 is a series of related events or conditions in an exchange of electricity between the electric vehicle and charging station. The activities of charging process 318 may include, for example, identification of parties and preferences, the authenticating data, storing data, analyzing data, or any other event or condition that is directly related to or incidental to the exchange of electricity. In the simplest form, charging process 318 involves a flow of electricity into the electric vehicle from the power grid or out of the electric vehicle and back into the power grid. Energy transaction execution engine 316 then monitors and logs the health and safety of charging process 318, and receives interrupt notifications from energy transaction interrupt monitor 320.

Energy transaction interrupt monitor 320 monitors data transmissions and conditions that result from the execution of charging process 318 to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction approval service 312 to validate the financial elements of the energy transaction plan prior to plan approval and prior to charging the electric vehicle.

The post-charge phase comprises analysis of the completed energy transaction to provide incentives, redeem credits or benefits, and induce specific behaviors by one or more parties involved in the charging transaction. The post-charge phase also includes payment of the appropriate parties for the energy transaction in accordance with the energy transaction plan governing the transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

The illustrative embodiments discuss an energy transaction interrupt monitor that monitors a charging process for interruptions. Detection of interruptions enables an interrupt monitor to notify an energy transaction execution engine to terminate the charging process. Termination of the charging process in light of interruptions insures that a charging process facilitates the settlement of a charging process. For example, if a charging process completes in violation of a charging plan, then difficulties may arise in calculating an amount due and to whom. In addition, the implementation of an energy transaction interrupt monitor may protect the integrity of components of an electric vehicle transaction infrastructure. For example, dangerous conditions that may arise from malfunctioning components may be detected. Subsequently, a charging process may be terminated to prevent the dangerous condition from further escalating and causing irreparable harm to components of the electric vehicle transaction infrastructure.

According to one embodiment, a computer implemented method, apparatus, and computer usable program code is provided for managing a charging process of an electric vehicle. The process begins by monitoring a set of operational parameters of the charging process for one or more interruptions in response to receiving, from an energy transaction execution engine, a request signaling the start of the charging process. The process then detects the one or more interruptions from the set of operational parameters, which conform to a set of predefined interrupt conditions. In one embodiment, the one or more interruptions include at least one of a device capability interruption, a preference interruption, and a data services interruption. As used herein the phrase "at least one of" when used with a list of items means that different combinations one or more of the items may be used and only one of each item in the list may be needed. For example, "at least one of item A, item B, and item C" may include, for example, without limitation, item A or item A and item B. This example also may include item A, item B, and item C or item B and item C. In other words, the interruptions may include either a device capability interruption, a preference interruption, a data services interruption, or any combination thereof. Thereafter, the process sends a response to the energy transaction execution engine to terminate the charging transaction in response to detecting the one or more interruptions.

Figure 4:
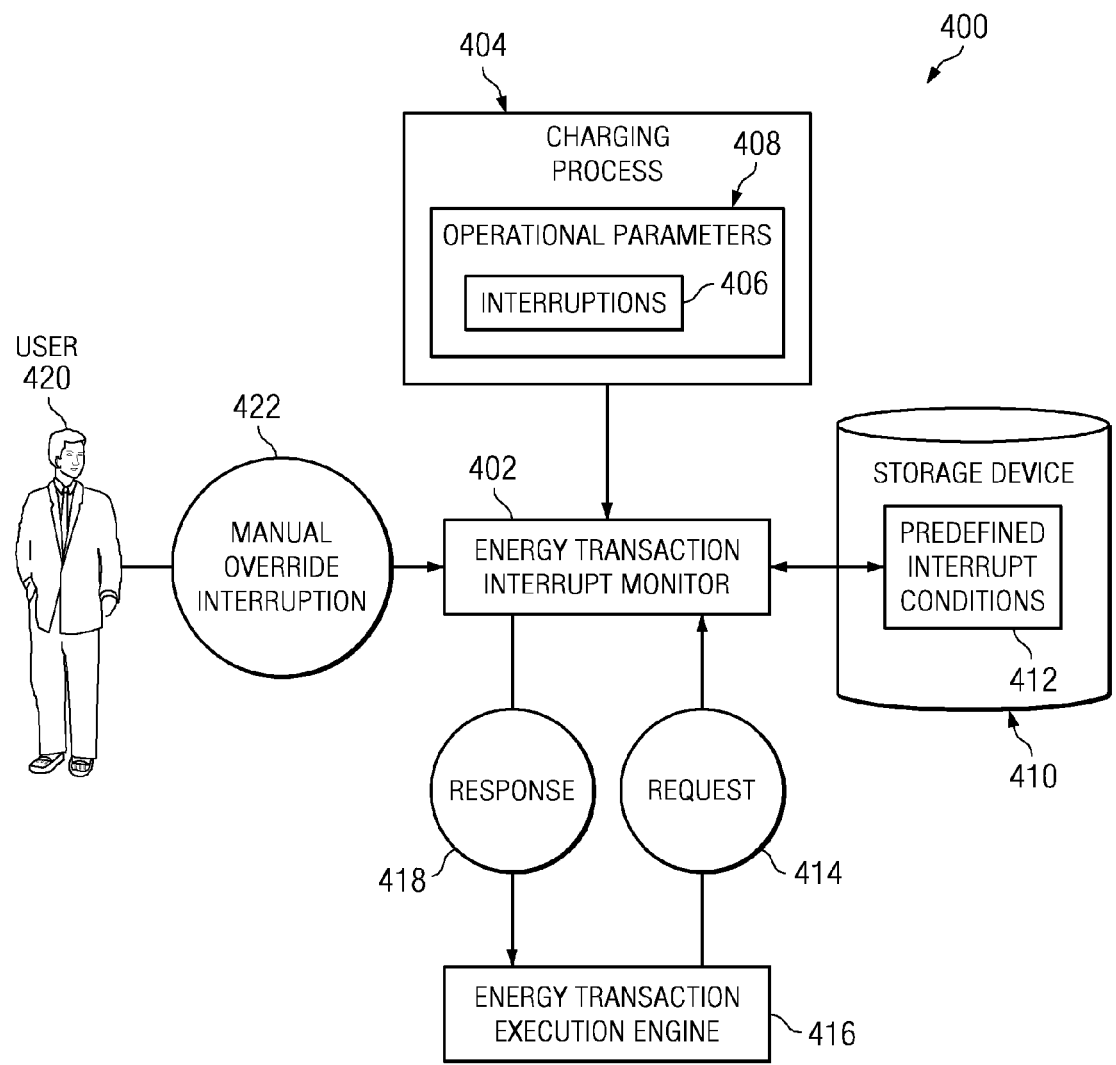
FIG. 4 is a system for managing a charging process of an electric vehicle in accordance with an illustrative embodiment.

FIG. 4 is a system for managing a charging process of an electric vehicle in accordance with an illustrative embodiment. System 400 is a data processing system, such as network data processing system 100 in FIG. 1. System 400 may include or be incorporated into an electric vehicle energy transaction infrastructure, such as electric vehicle energy transaction infrastructure 300 in FIG. 3.

System 400 includes energy transaction interrupt monitor 402. Energy transaction interrupt monitor 402 is an energy transaction interrupt monitor, such as energy transaction interrupt monitor 320 in FIG. 3. More specifically, energy transaction interrupt monitor 402 is a software component for monitoring charging process 404. Charging process 404 is a charging process, such as charging process 318 in FIG. 3. Charging process 404 is the process by which electricity is transferred between an electric vehicle and a charging station. Charging process 404 may include other events directly or indirectly related to the transfer of electricity between the electric vehicle and charging station. For example, charging process 404 may include the transfer and storage of data describing charging process 404, the allocation of incentives or benefits related to the transfer of electricity, the identification of parties and preferences, the authenticating data, or any other event.

Energy transaction interrupt monitor 402 monitors charging process 404 for interruptions 406. Interruptions 406 is a set of one or more events or circumstances that terminates charging process 404 when detected by energy transaction interrupt monitor 402. Interruptions 406 may be of different types, such as, for example, device capability interruptions, preference interruptions, and data services interruptions. Device capability interruptions, preference interruptions, and data services interruptions are discussed in more detail in FIG. 5.

Energy transaction interrupt monitor 402 detects interruptions 406 by monitoring operational parameters 408 that are generated during charging process 404. Operational parameters 408 is a set of data generated by components of an electric vehicle transaction infrastructure, such as electric vehicle energy transaction infrastructure 300 in FIG. 3. Operational parameters 408 may include, for example, prices of electricity, available incentives, data transmission speeds, connectivity of components to the electric vehicle transaction infrastructure, or deviations from an energy plan. Operational parameters 408 monitored by energy transaction interrupt monitor 402 may be aggregated and stored in storage device 410. Storage device 410 is a device for storing data. Storage device 410 may be, for example, a hard drive, flash memory, main memory, read only memory (ROM), random access memory (RAM), a magnetic or optical disk drive, tape, or any other type of data storage device. Storage device 410 may be implemented in a single storage device or a plurality of storage devices. Once stored, operational parameters 408 may be subsequently used for creating audits of past charging transactions.

Energy transaction interrupt monitor 402 identifies interruptions 406 from operational parameters 408. In particular, energy transaction interrupt monitor 402 identifies interruptions 406 by identifying the operational parameters from operational parameters 408 that conform to predefined interrupt conditions 412. Predefined interrupt conditions 412 is a set of one or more rules or algorithms for identifying interruptions 406 from operational parameters 408. Predefined interrupt conditions 412 may be extracted from an energy transaction plan. An energy transaction plan is a set of guidelines for executing charging process 404. For example, predefined interrupt conditions 412 may include a rule that specifies a threshold temperature of an electric vehicle battery that, if exceeded, causes energy transaction interrupt monitor 402 to identify the battery temperature as an interruption. Thus, while monitoring operational parameters 408 generated during charging process 404, if energy transaction interrupt monitor 402 detects data describing the electric vehicle's battery temperature above the threshold temperature, then energy transaction interrupt monitor 402 may identify the battery temperature as interruptions 406. Alternatively, predefined interrupt conditions 412 may specify an algorithm for identifying interruptions 406 from operational parameters 408. For example, predefined interrupt conditions 412 may identify the threshold battery temperature as a percentage of the normal operating temperature. Thus, if the battery temperature exceeds fifty percent of the normal operating temperature, then energy transaction interrupt monitor 402 may identify the battery temperature as interruptions 406.

Energy transaction interrupt monitor 402 begins monitoring operational parameters 408 for interruptions 406 in response to receiving request 414. Request 414 is a message signaling the start of charging process 404. Request 414 is generated and sent by energy transaction execution engine 416. Energy transaction execution engine 416 is an energy transaction execution engine such as energy transaction execution engine 316 in FIG. 3.

Once interruptions 406 is identified from operational parameters 408, energy transaction interrupt monitor 402 sends response 418 to energy transaction execution engine 416. Response 418 is a message that may instruct energy transaction execution engine 416 to terminate charging process 404. However, in the event that energy transaction interrupt monitor 402 does not detect an interruption from the monitoring of operational parameters 408, response 418 may take the form of a message informing energy transaction execution engine 416 that charging process 404 has successfully completed and that no interruptions had been detected.

In another embodiment, user 420 may terminate charging process 404 in the absence of energy transaction interrupt monitor 402 detecting interruptions 406. User 420 is an owner or operator of an electric vehicle. In addition, user 420 may be, for example, a charging station attendant. User 420 may terminate charging process 404 by generating manual override interruption 422. Manual override interruption 422 is an instruction that causes energy transaction execution engine 416 to terminate charging process 404. User 420 may generate manual override interruption 422 by interacting with a user interface located at the charging station or on the electric vehicle. In addition, user 420 may generate manual override interruption 422 at a remote location by implanting a user interface presented on a remote computing device. For example, user 420 may utilize a cell phone or computer for accessing a user interface for generating manual override interruption 422.

As depicted, manual override interruption 422 is sent to energy transaction interrupt monitor 402. In this example, in response to receiving manual override interruption 422, energy transaction interrupt monitor 402 generates response 418 that instructs energy transaction execution engine 416 to terminate charging process 404. However, in an alternate embodiment, manual override interruption 422 may be sent directly to energy transaction execution engine 416 for terminating charging process 404.

In an illustrative embodiment, energy transaction execution engine 416 sends request 414 to energy transaction interrupt monitor 402. Request 414 informs energy transaction interrupt monitor 402 that charging process 404 has begun. In response to receiving request 414, energy transaction interrupt monitor 402 monitors operational parameters 408 for interruptions 406. Energy transaction interrupt monitor 402 identifies interruptions 406 by identifying events or conditions of operational parameters 408 that conform to predefined interrupt conditions 412.

Upon detecting interruptions 406, energy transaction interrupt monitor 402 sends response 418 to energy transaction execution engine 416. Energy transaction execution engine 416 may then terminate charging process 404. If energy transaction interrupt monitor 402 does not detect any interruptions during charging process 404, then energy transaction interrupt monitor 402 sends response 418 to notify energy transaction execution engine 416 that charging process 404 has successfully completed.

Either during charging process 404 or sometime thereafter, energy transaction interrupt monitor 402 may store operational parameters 408 into storage device 410. Energy transaction interrupt monitor 402 may store operational parameters 408 in storage device 410 for post-charge analysis, auditing, recordkeeping, or any other purpose.

Figure 5:
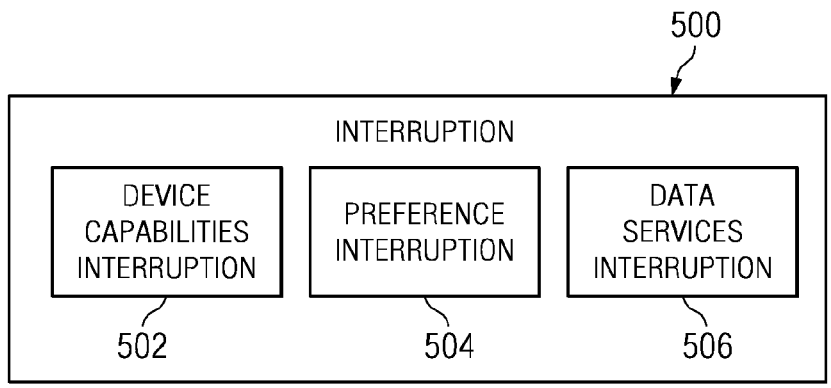
FIG. 5 is a block diagram of interruptions in accordance with an illustrative embodiment.

FIG. 5 is a block diagram of interruptions in accordance with an illustrative embodiment. Interruption 500 is a set of one or more interruptions, such as interruptions 406 in FIG. 4. Interruption 500 is identified from operational parameters of a charging process using predefined interruption conditions, as is described in FIG. 4.

Interruption 500 may include device capabilities interruption 502. Device capabilities interruption 502 is a set of one or more interruptions that originates from components of an electric vehicle energy transaction infrastructure, such as electric vehicle energy transaction infrastructure 300 in FIG. 3. For example, device capabilities interruption 502 may include battery temperatures, transaction plan amperage, charging device connectivity, charging device ground wire functionality, stability of charging devices, or any other condition or status associated with components of an electric vehicle energy transaction infrastructure.

Interruption 500 may also include preferences interruption 504. Preferences interruption 504 is a set of one or more interruptions that are caused from a violation of a user-specified preference. The user-specified preference may be, for example, a preference specified by an owner or operator of an electric vehicle or a utility provider. Thus, a user may specify a preference for a threshold cost for charging an electric vehicle. If the cost of charging the electric vehicle during a charging process exceeds the user cost preference, then an energy transaction interrupt monitor identifies the cost as preference interruption 504. Other parties may also specify preferences, the violation of which results in identification of preference interruption 504. Preferences for the user or third parties may be set in an energy transaction plan or stored in a data storage device accessible to the energy transaction interrupt monitor.

Interruption 500 may also include data services interruption 506. Data services interruption 506 is a set of one or more interruptions caused by the inability for information to be exchanged with data services sources. Data service sources are sources of data, such as, for example, energy data services 308 in FIG. 3. Data services interruption 506 may be caused by power outages, broken transmission lines, or any other problems preventing a data service from exchanging information with other components of an electric vehicle transaction infrastructure.

Figure 6:
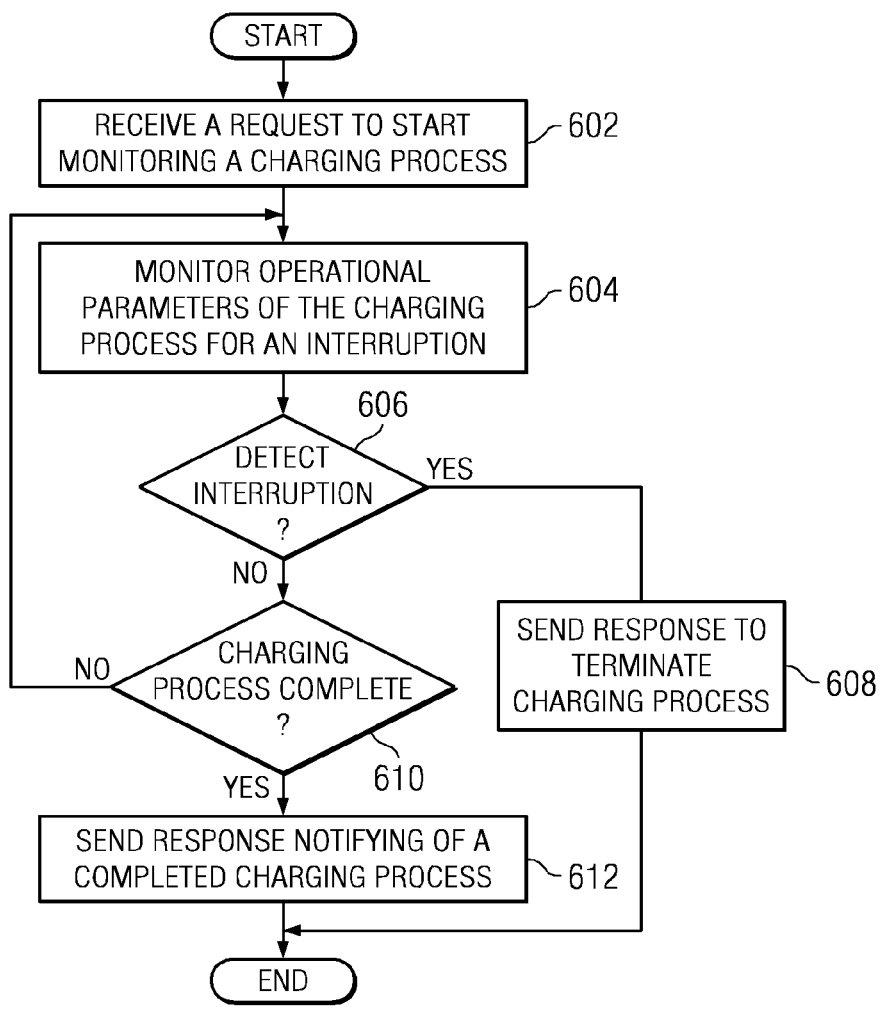
FIG. 6 is a flowchart of a process for managing a charging process of an electric vehicle in accordance with an illustrative embodiment.

FIG. 6 is a flowchart of a process for managing a charging process of an electric vehicle in accordance with an illustrative embodiment. The process in FIG. 6 may be implemented in a software component, such as energy transaction interrupt monitor 402 in FIG. 4.

The process begins by receiving a request to start monitoring of a charging process (step 602). The request may be received from an energy transaction execution engine, such as energy transaction execution engine 316 in FIG. 3. The process then monitors a set of operational parameters of a charging process for an interruption (step 604). The set of operational parameters is a set of operational parameters, such as set of operational parameters 408 in FIG. 4. In addition, the charging process is a charging process, such as charging process 404 in FIG. 4.

The process then makes the determination as to whether an interruption is identified (step 606). The interruption may be identified if an event or condition described by the operational parameters of the charging process conforms to predefined interrupt conditions. Predefined interrupt conditions are predefined interrupt conditions, such as predefined interrupt conditions 412 in FIG. 4. If an interruption is identified, then the process sends a response to terminate the charging process (step 608) and the process terminates. The response may be sent to an energy transaction execution engine, such as energy transaction execution engine 416 in FIG. 4.

Returning now to step 606, if the process makes the determination that an interruption is not identified, then the process makes the determination as to whether the charging process is complete (step 610). If the charging process is not complete, then the process returns to step 604 to continue monitoring for interruptions. If the process makes the determination that the charging process is complete, then the process sends a response notifying of a completed charging process (step 612) and the process terminates. The response may be sent to an energy transaction execution engine, such as energy transaction execution engine 316 in FIG. 3.

Figure 7:
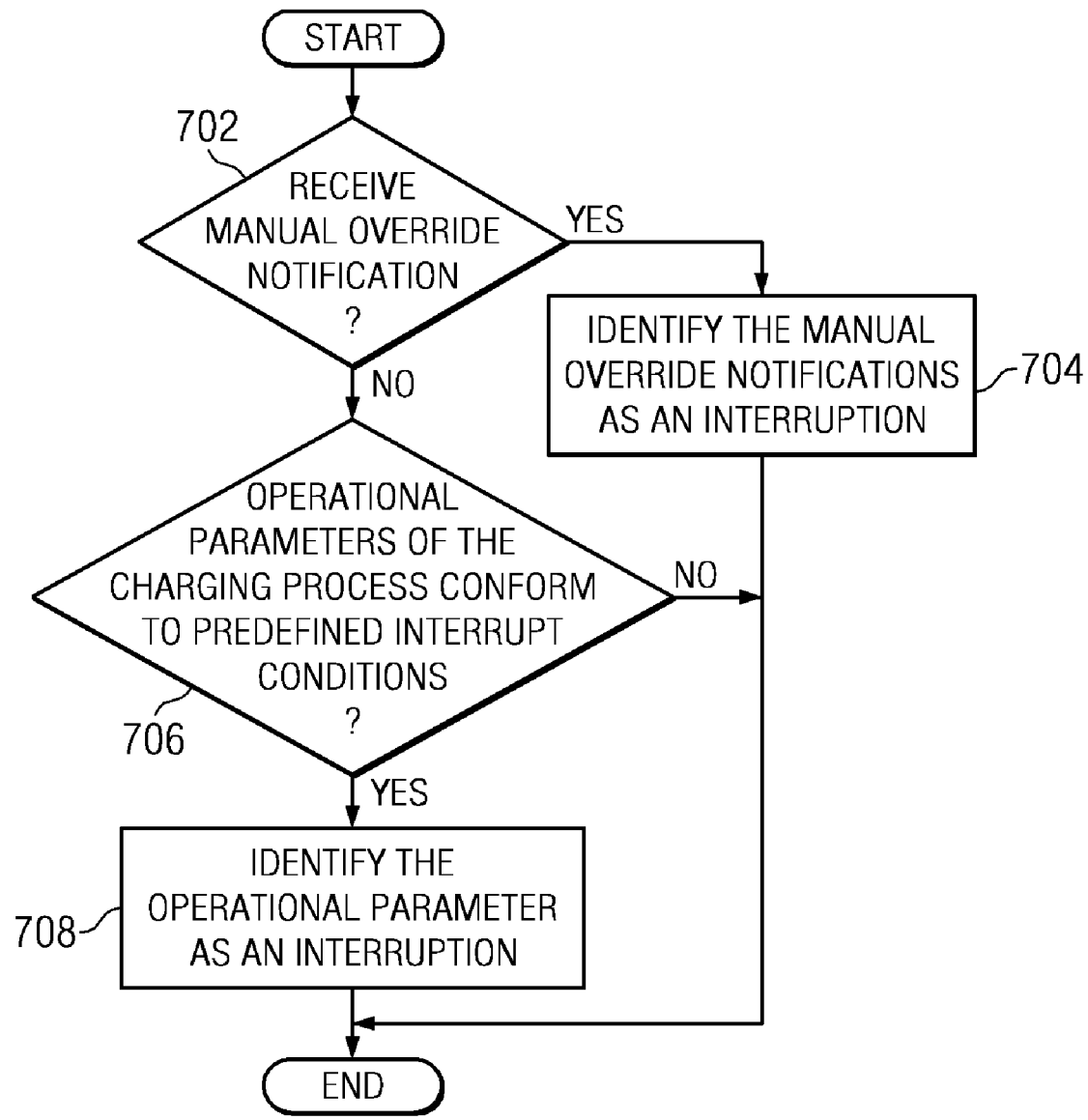
FIG. 7 is a flowchart of a process for identifying interruptions in accordance with an illustrative embodiment.

FIG. 7 is a flowchart of a process for identifying an interruption in accordance with an illustrative embodiment. The process in FIG. 7 may be implemented by a software component, such as energy transaction interrupt monitor 402 in FIG. 4.

The process begins by making the determination as to whether an operational parameter of the charging process conforms to predefined interrupt conditions (step 702). The predefined interrupt conditions are predefined interrupt conditions, such as predefined interrupt conditions 412 in FIG. 4. If the process makes the determination that an operational parameter of the charging process conforms to predefined interrupt conditions, then the process identifies the operational parameter as an interruption (step 704). The process then makes the determination as to whether the charging process is done (step 706). If the process makes the determination that the charging process is done, then the process terminates. However, if the process makes the determination that the charging process is not done, then the process returns to step 702.

At step 702, if the process makes the determination that operational parameters of the charging process do not conform to the predefined interrupt conditions, then the process continues to step 706.

According to one embodiment, a computer implemented method, apparatus, and computer usable program code is provided for managing a charging process of an electric vehicle. The process begins by monitoring a set of operational parameters of the charging process for one or more interruptions in response to receiving, from an energy transaction execution engine, a request signaling the start of the charging process. The process then detects the one or more interruptions from the set of operational parameters, which conform to a set of predefined interrupt conditions. In one embodiment, the one or more interruptions include at least one of a device capability interruption, a preference interruption, and a data services interruption. The process sends a response to the energy transaction execution engine to terminate the charging transaction in response to detecting the one or more interruptions.

The embodiments disclosed herein illustrate an energy transaction interrupt monitor that monitors a charging process for interruptions. Detection of interruptions enables an energy transaction interrupt monitor to notify an energy transaction execution engine to terminate the charging process. Termination of the charging process because of detecting interruptions may insure that the charging process proceeds according to the terms and conditions that were established by parties to the charging process. For example, if a charging process completes in violation of a charging plan, then difficulties may arise in calculating an amount due and to whom.

In addition, the implementation of an energy transaction interrupt monitor may protect the integrity of components of an electric vehicle transaction infrastructure. For example, dangerous conditions that may arise from malfunctioning components may be detected. Subsequently, a charging process may be terminated to prevent the dangerous condition from further escalating and causing irreparable harm to components of the electric vehicle transaction infrastructure.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing a charging process of an electric vehicle, the computer implemented method comprising:
   responsive to receiving, from an energy transaction execution engine, a request signaling a start of the charging process, monitoring a set of operational parameters of the charging process during the flow of electricity for one or more interruptions;
   detecting the one or more interruptions during the flow of electricity from the set of operational parameters which conform to a set of predefined interrupt conditions, wherein the one or more interruptions comprise at least one of a device capabilities interruption, a preference interruption, and a data services interruption; and
   responsive to detecting the one or more interruptions, sending a response to the energy transaction execution engine to terminate the charging process.

2. The computer implemented method of claim 1, wherein the one or more interruptions is a manual override interruption, and wherein the computer implemented method further comprises:
   responsive to receiving, from a user, the manual override interruption, terminating the charging process.

3. The computer implemented method of claim 1, further comprising:

storing the set of operational parameters in a storage device.

4. The computer implemented method of claim 1, wherein the one or more interruptions is the device capabilities interruption, and the device capabilities interruption originates from at least one component of an electric vehicle transaction infrastructure.

5. The computer implemented method of claim 1, wherein the one or more interruptions is the preference interruption, and the preference interruption is detected from a violation of a preference selected by a participant to the charging process.

6. The computer implemented method of claim 1, wherein the one or more interruptions is the data services interruption, and the data services interruption originates from a failure in data transmission.

7. The computer implemented method of claim 1, wherein the one or more interruptions are detected by identifying an operational parameter from the set of operational parameters that conform to the set of predefined interrupt conditions.

8. A computer program product for managing a charging process of an electric vehicle, the computer program product comprising:
a tangible computer-recordable storage medium;
first program instructions to monitor a set of operational parameters of the charging process during the flow of electricity for one or more interruptions in response to receiving, from an energy transaction execution engine, a request signaling a start of the charging process;
second program instructions to detect the one or more interruptions during the flow of electricity from the set of operational parameters which conform to a set of predefined interrupt conditions, wherein the one or more interruptions comprise at least one of a device capabilities interruption, a preference interruption, and a data services interruption;
third program instructions to send a response to the energy transaction execution engine to terminate the charging process in response to detecting the one or more interruptions; and wherein the first program instructions, the second program instructions, and the third program instructions are stored on the tangible computer-recordable storage medium.

9. The computer program product of claim 8, wherein the one or more interruptions is a manual override interruption, and wherein the computer program product further comprises:
fourth program instructions for terminating the charging process in response to receiving, from a user, the manual override interruption.

10. The computer program product of claim 8, further comprising:
fifth program instructions to store the set of operational parameters in a storage device.

11. The computer program product of claim 8, wherein the one or more interruptions is the device capabilities interruption, and the device capabilities interruption originates from at least one component of an electric vehicle transaction infrastructure.

12. The computer program product of claim 8, wherein the one or more interruptions is the preference interruption, and the preference interruption is detected from a violation of a preference selected by a participant to the charging process.

13. The computer program product of claim 8, wherein the one or more interruptions is the data services interruption, and the data services interruption originates from a failure in data transmission.

14. The computer program product of claim 8, wherein the one or more interruptions are detected by identifying an operational parameter from the set of operational parameters that conform to the set of predefined interrupt conditions.

15. An apparatus comprising:
a bus system;
a memory connected to the bus system, wherein the memory includes a computer usable program code; and
a processing unit connected to the bus system, wherein the processing unit executes the computer usable program code to monitor a set of operational parameters of a charging process during the flow of electricity for one or more interruptions in response to receiving, from an energy transaction execution engine, a request signaling a start of the charging process; detect the one or more interruptions during the flow of electricity from the set of operational parameters which conform to a set of predefined interrupt conditions, wherein the one or more interruptions comprise at least one of a device capabilities interruption, a preference interruption, and a data services interruption; and send a response to the energy transaction execution engine to terminate the charging process in response to detecting the one or more interruptions.

16. The apparatus of claim 15, wherein the one or more interruptions is a manual override interruption, and wherein the processing unit further executes the computer usable program code to terminate the charging process in response to receiving, from a user, the manual override interruption.

17. The apparatus of claim 15, wherein the processing unit further executes the computer usable program code to store the set of operational parameters in a storage device.

18. The apparatus of claim 15, wherein the one or more interruptions is the device capabilities interruption, and the device capabilities interruption originates from at least one component of an electric vehicle transaction infrastructure.

19. The apparatus of claim 15, wherein the one or more interruptions are detected by identifying an operational parameter from the set of operational parameters that conform to the set of predefined interrupt conditions.

20. A system for managing a charging process of an electric vehicle, the system comprising:
an energy transaction execution engine, wherein the energy transaction execution engine executes the charging process;
an energy transaction interrupt monitor, wherein the energy transaction interrupt monitor monitors a set of operational parameters of the charging process during the flow of electricity for one or more interruptions in response to receiving, from the energy transaction execution engine, a request signaling a start of the charging process; detects the one or more interruptions during the flow of electricity from the set of operational parameters which conform to a set of predefined interrupt conditions, wherein the one or more interruptions comprise at least one of a device capabilities interruption, a preference interruption, and a data services interruption; and sends a response to the energy transaction execution engine to terminate the charging process in response to detecting the one or more interruptions.

* * * * *